(12) United States Patent
Bickham et al.

(10) Patent No.: US 7,406,237 B2
(45) Date of Patent: Jul. 29, 2008

(54) MULTIBAND OPTICAL FIBER

(75) Inventors: Scott Robertson Bickham, Corning, NY (US); Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/708,214

(22) Filed: Feb. 20, 2007

(65) Prior Publication Data

US 2007/0196061 A1      Aug. 23, 2007

Related U.S. Application Data

(60) Provisional application No. 60/775,576, filed on Feb. 21, 2006.

(51) Int. Cl.
   *G02B 6/02*      (2006.01)
(52) U.S. Cl. ........................ 385/127; 385/123
(58) Field of Classification Search .......... 385/123–128
   See application file for complete search history.

(56) References Cited

U.S. PATENT DOCUMENTS

| | | | | |
|---|---|---|---|---|
| 4,204,745 | A | 5/1980 | Sakai et al. | 350/96.31 |
| 4,877,304 | A | 10/1989 | Bhagavatula | 350/96.29 |
| 5,329,607 | A | 7/1994 | Kamikawa et al. | 385/123 |
| 6,771,865 | B2 | 8/2004 | Blaszyk et al. | 385/127 |
| 6,798,962 | B2 | 9/2004 | Berkey et al. | 385/124 |
| 6,885,802 | B2 | 4/2005 | Oliveti et al. | 385/123 |
| 7,171,090 | B2 | 1/2007 | Mattingly, III et al. | 385/124 |
| 7,272,289 | B2 * | 9/2007 | Bickham et al. | 385/128 |
| 7,336,877 | B2 * | 2/2008 | Bickham | 385/127 |
| 2003/0161597 | A1 | 8/2003 | Berkey et al. | 385/123 |
| 2004/0033039 | A1 | 2/2004 | Oliveti et al. | 385/123 |
| 2006/0045450 | A1 | 3/2006 | Bickham | 385/127 |

OTHER PUBLICATIONS

Honghai Wang, et al., "Preparation and Characteristics of 85nm-Optimized Single-Mode Optical Fiber", Proc. Of SPIE vol. 5279, 2003, pp. 35-39.

Honghai Wang, et al., "Matched-Cladding Single-Mode Optical Fiber Optimized at 850nm Wavelength", Acta Optica Sinica, vol. 23, suppl., No. 1, Oct. 2003.

Helge E. Engan, et al., "Propagation and Optical Interaction of Guided Acoustic Waves in Two-Mode Optical Fibers", Journal of Lightwave Technology, vol. 6. No. 3, Mar. 1988, pp. 428-436.

Kenichi Kitayama, et al., "Experimental Verification of Modal Dispersion Free Characteristics in a Two-Mode Optical Fiber", IEEE Journal of Quantum Electronics, vol. QE-15, No. 1, Jan. 1979, pp. 6-8.

(Continued)

*Primary Examiner*—Sarah Song
(74) *Attorney, Agent, or Firm*—Joseph M. Homa; Matthew J. Mason

(57) ABSTRACT

An optical waveguide fiber having a core surrounded by a cladding. The core may have only a central segment, or a central segment and an annular segment surrounding the central segment. The central segment has a positive relative refractive index profile. The annular segment has a negative relative refractive index profile. The relative refractive index of the optical fiber provides an LP02 cable cutoff less than 850 nm and an LP21 cable cutoff less than 850 nm.

17 Claims, 4 Drawing Sheets

OTHER PUBLICATIONS

Yasuyuki Kato, et al., "Design Consideration on Broad-Band W-Type Two-Mode Optical Fibers", IEEE Transactions on Microwave Theory and Techniques, vol. MTT-30, No. 1, Jan. 1982, pp. 1-5.

Ken-Ichi Kitayama, et al., "Transmission Characteristic Measurement of Two-Mode Optical Fiber with a Nearly Optimum Index-Profile", IEEE Transaction on Microwave Theory and Techniques, vol. MTT-28, No. 6, Jun. 1980, pp. 604-608.

George Kotrosios, et al., "Mode-holding capability of dual-mode fibers", Optics Letters, vol. 15, No. 7, Apr. 1, 1990, pp. 360-362.

Masashi Eguchi, et al., "Dispersion Compensation Based on Dual-Mode Optical Fiber with Inhomogeneous Profile Core", Journal of Lightwave Technology, vol. 14, No. 10, Oct. 1996, pp. 2387-2394.

Jun-Ichi Sakai, et al., "Design Considerations of Broadband Dual-Mode Optical Fibers", IEEE Transactions on Microwave Theory and Techniques, vol. MTT-26, No. 9, Sep. 1978, pp. 658-665.

* cited by examiner

MULTIBAND OPTICAL FIBER

This application claims the benefit of U.S. Provisional Application No. 60/775,576, filed Feb. 21, 2006, entitled "MULTIBAND OPTICAL FIBER".

BACKGROUND OF THE INVENTION

1. Field of the Invention

The present invention is directed generally to optical fiber for telecommunications and more specifically to an optical fiber capable of dual mode operation at wavelengths below about 1260 nm and single mode operation at wavelengths above about 1260 nm.

2. Technical Background

Multimode fiber suitable for operation at 850 nm has typically been chosen for wiring homes and small businesses because the various system components (e.g. lasers, receivers) used in conjunction with this fiber are inexpensive. However, conventional 850 nm multimode fiber has undesirably low bandwidth and can support only a relatively low bit rate. Furthermore, conventional 850 nm multimode fiber is incompatible with higher bit rate components, such as 1300 nm single mode lasers and receivers. Thus, both components and fiber typically must be replaced to upgrade to a higher bit rate system.

Known experimental fibers capable of both multimode operation at 850 nm and single mode operation at 1300 nm have been reported in the literature, however, those fibers had step index profiles and tended to have very low bandwidth at 850 nm.

U.S. Patent Publication No. 2003/0161597 ("'597 Publication") discloses an optical fiber capable of multimode operation at 850 nm and single mode operation at 1300 nm. The embodiments disclosed in Table I the '597 Publication have bandwidths of 0.6 to 1.5 GHz.km and would only be capable of transmitting 10 Gb/s signals along distances of 60 to 150 m, lower than needed in most local area networks.

U.S. Patent Publication No. 2004/0033039 ("'039 Publication") discloses an optical fiber with modest bandwidths at 850 nm.

Intermodal noise is a problem typically associated with multimode fibers. Intermodal noise is related to a variation of the optical intensity at a given optical fiber output location due to optical interference between modes of different phase. Many factors may act singly or in combination to produce phase changes that can cause intermodal noise. Some factors include: changes in temperature; mechanical distortions (including movement or vibration); and, changes in optical source wavelength.

Intermodal noise is a common problem in multimode fibers when used with highly coherent light sources, e.g., lasers, because the relative coherence of the modes allows the modes to affect the intensity of the light by interfering with each other. Less coherent sources, such as LED's, have a short coherence length and therefore are only subject to intermodal noise in very short lengths of fiber. However, LED sources are polychromatic and cause significant pulse broadening in the fiber, and pulse broadening reduces bandwidth. Therefore, it would be advantageous to have a fiber designed for operation with coherent light sources which does not suffer from intermodal noise.

SUMMARY OF THE INVENTION

Optical waveguide fibers are disclosed herein which are suitable for optical transmissions in one or more wavelength bands. The optical fibers disclosed herein support only LP01 light signal transmission (so-called single mode transmission) for wavelengths above the cable cutoff, and only LP01 and LP11 light signal transmission for wavelengths below the cable cutoff and above a predetermined wavelength that is lower than the cable cutoff. The optical fibers disclosed herein have a high bandwidth at wavelengths around 850 nm.

The optical fiber described and disclosed herein allows suitable performance at a plurality of operating wavelength windows between about 800 nm and about 1650 nm. The optical fiber described and disclosed herein allows suitable single mode performance at a plurality of wavelengths from about 1260 nm to about 1650 nm and dual mode performance at a plurality of wavelengths from about 800 nm to about 1260 nm. In one embodiment, the optical fiber described and disclosed herein is a multi-band or multi-window fiber which can accommodate operation in three or more wavelength bands, such as at least the 850 nm window, the 1310 nm window, and the 1550 nm window. In another embodiment, the optical fiber described and disclosed herein is a multiple window fiber which can accommodate operation in at least the 850 nm window, the 980 nm window, the 1310 nm window, and the 1550 nm window.

Reference will now be made in detail to the present preferred embodiments of the invention, examples of which are illustrated in the accompanying drawings.

DETAILED DESCRIPTION OF THE PREFERRED EMBODIMENT

Figure 1:
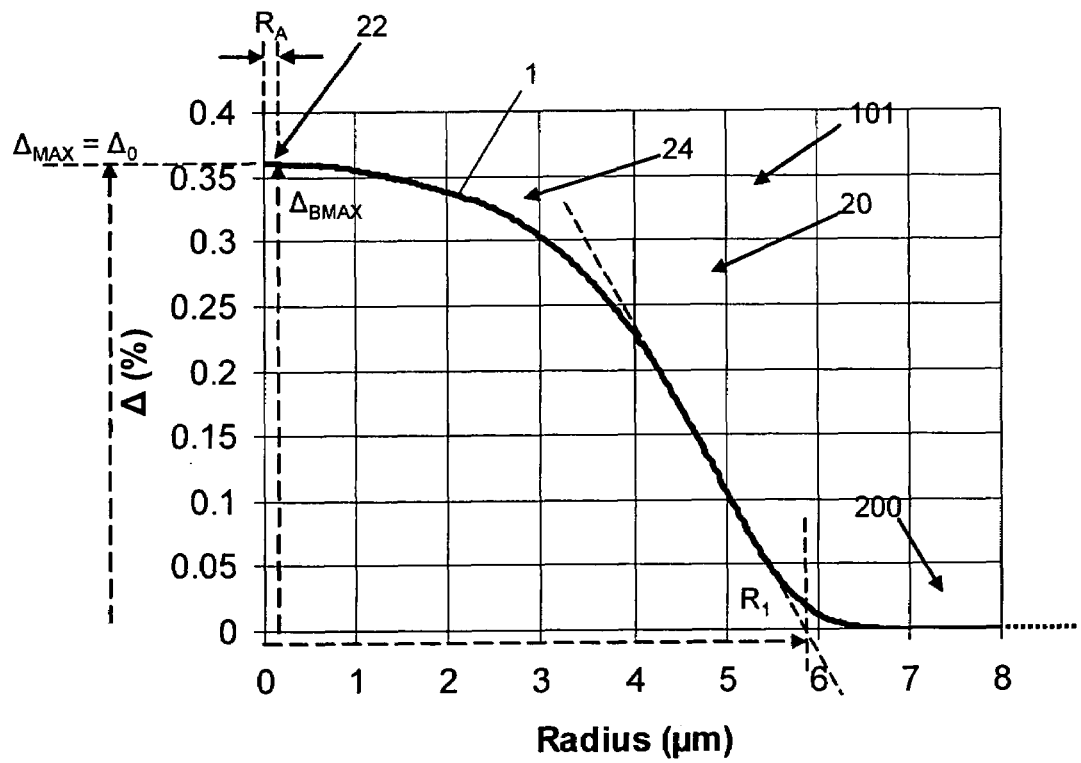
FIGS. 1-2 show refractive index profiles corresponding to a first set of embodiments of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$, i.e. an index-increasing dopant. A "downdopant" is herein considered to be a dopant which has a propensity to lower the refractive index relative to pure undoped $SiO_2$, i.e. an index-decreasing dopant. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the intermodal dispersion. In the case of single mode waveguide fibers the inter-modal dispersion is zero. Dispersion values in a two-moded regime assume intermodal dispersion is zero. Zero dispersion wavelength is a wavelength at which the dispersion has a value of zero. Dispersion slope is the rate of change of dispersion with respect to wavelength.

"Effective area" is defined as:

$$A_{eff}=2\pi(\int f^2 \, r \, dr)^2/(\int f^4 \, r \, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of Δ(r) which is in units of "%", where r is radius, which follows the equation, $$\Delta(r)=\Delta(r_o)(1-[|r-r_o|/(r_1-r_o)]^{\alpha}),$$

where $r_o$ is the point at which Δ(r) is maximum, $r_1$ is the point at which Δ(r)% is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int f^2 \, r \, dr/\int [df/dr]^2 \, r \, dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement (when using the multimode reference technique), i.e. no power is observed in the mode at wavelengths longer than the measured cutoff. The actual fiber cutoff can be measured by the standard 2m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" or "cable cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Bandwidth can be measured by using the TIA/EIA Standard described in TIA/EIA-455-204 "Measurement of Bandwidth on Multimode Fiber", or "FOTP-204", or by using the TIA/EIA Standard described in TIA/EIA-455-220 "Differential Mode Delay Measurement of Multimode Fiber in the Time Domain", or "FOTP-220", as appropriate.

Unless otherwise noted herein, optical properties (such as dispersion, dispersion slope, etc.) are reported for the LP01 mode.

Various wavelength bands, or operating wavelength ranges, or wavelength windows, can be defined as follows: "850 nm band" is 800 to 900 nm; "980 nm band" is 900-1100 nm; "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

The optical fiber disclosed herein comprises a core and an outer annular cladding surrounding and directly adjacent the core. In some embodiments, the cladding is essentially pure silica. The cladding has a relative refractive index profile, $\Delta_C(r)=0$, preferably, throughout the entire cladding, and the cladding extends radially outwardly until the outermost radius of the silica-based part of the optical fiber (excluding any coating). The core comprises a refractive index profile, $\Delta_{CORE}(r)$. In some embodiments, the core comprises a single central core segment; in other embodiments, the core comprises a plurality of core segments, each having respective refractive index profiles. Optical waveguide fibers 100 are disclosed herein which comprise a core 101 extending radially outwardly from the centerline to a core radius $R_{CORE}$, and an outer annular cladding 200 directly adjacent to the core 20. The Figures herein illustrate profiles for radii up to 8 or 10 µm, however the outer annular cladding extends beyond such radii, as indicated by the dotted lines in the Figures. In some embodiments, the outer annular cladding 200 extends to a radius of about 62.5 µm.

The optical fiber 100 disclosed herein comprises a central core segment 20 comprising a central peak region 22 and an alpha region 24 surrounding the central peak region. The central core segment 20 extends radially to an outer radius, $R_1$. The highest relative refractive index value for the central peak region 22 is the highest value for the central core segment $\Delta_{1MAX}$, which is also the highest relative refractive index value $\Delta_{MAX}$ (and highest refractive index value) for the entire optical fiber. The relative refractive index profile of the alpha region 24 exhibits an alpha ($\alpha$) shape. The alpha region 24 comprises a maximum relative refractive index $\Delta_{BMAX}$. In some embodiments, at least for a portion of the radial extent of the central peak region 22 has a substantially flat relative refractive index profile, herein called a flat portion, and in some of these embodiments the relative refractive index profile of the central peak region 22 is substantially flat across its entire radial extent starting from the centerline, r=0, such that the relative refractive index value at the centerline, $\Delta_0$, is substantially equal to $\Delta_{MAX}$. However, the relative refractive index profile of the central peak region 22 may also comprise a centerline dip 26 such that the relative refractive index at or near the centerline is less than $\Delta_{MAX}$, for example where $\Delta_0 < \Delta_{MAX}$. Thus, in preferred embodiments, the alpha region 24 is offset radially away from the centerline by the presence of the central peak region 22, wherein the central peak region 22 may include a centerline dip 26 and/or an extended flat portion, such that the entire relative refractive index profile of the central core segment 20 would not be entirely described by an alpha shape profile. As used herein, a flat relative refractive index value means a constant relative refractive index profile over a given radial extent or radial span.

In embodiments having a core 101 with an entirely non-negative relative refractive index profile, the core 101 comprises a central core segment 20 and an outer annular cladding 200 surrounding and directly adjacent the central core segment 20. The outer annular cladding 200 contacts the central core segment 20. The central core segment 20 comprises a central peak region 22 and an alpha region 24. The alpha region 24 surrounds and is directly adjacent the central peak region 22. In some embodiments, the central peak region 22 comprises a flat portion. In other embodiments, the entire central peak region 22 has a flat or substantially flat relative refractive index profile. The central peak region 22 preferably gradually and smoothly transitions into the alpha region 24. That is, the initial portion of the alpha region 24, although following the shape defined by the power exponent, $\alpha$, also does not vary much, and so is substantially constant at or near its innermost radius. In these embodiments, $\Delta_{MAX} \gtrsim \Delta_{BMAX}$, and $|\Delta_{MAX}-\Delta_{BMAX}|<0.02\%$, i.e. $0\%<(\Delta_{MAX}-\Delta_{BMAX})<0.02\%$.

In embodiments having a core 101 with at least one core segment having a relative refractive index profile with entirely positive values, and at least one core segment having a relative refractive index profile with negative values, the core 101 comprises a central core segment 20, an annular core segment 30 surrounding and directly adjacent the central core segment 20, and an outer annular cladding 200 surrounding and directly adjacent the annular core segment 30. The outer annular cladding 200 contacts the annular core segment 30. The relative refractive index profile of the central core segment 20 is entirely positive. The annular core segment 30 has a minimum relative refractive index $\Delta_{2MIN}$. The central core segment 20 comprises a central peak region 22 and an alpha region 24. The alpha region 24 surrounds and is directly adjacent the central peak region 22. The central peak region 22 further comprises a drop portion 28 which exhibits a decrease in relative refractive index from $\Delta_{MAX}$ to $\Delta_{BMAX}$. The difference $\Delta_{MAX}-\Delta_{BMAX}$ is preferably greater than or equal to 0.03% and less than or equal to 1.00%, and has a radial width, or radial extent or radial span, of less than 1.5 µm. Preferably, the midpoint of the drop portion 28 is located at a radius $R_D<2.0$ µm. In some embodiments, the central peak 22 region comprises a flat portion. In some embodiments, the central peak region 22 comprises a centerline dip 26. In other embodiments, the central peak region 22 comprises no centerline dip.

Optical fibers 100 disclosed herein provide the following: dispersion at 1550 nm between 16 and 20 ps/nm-km, preferably 16 to 19 ps/nm-km; dispersion slope at 1550 nm less than or equal to about 0.06 ps/nm²-km; attenuation at 1550 nm less than 0.20 dB/km, preferably less than 0.195 dB/km; attenuation at 1310 nm less than 0.4 dB/km, preferably less than 0.35 dB/km; effective area at 1550 nm greater than 60 µm², preferably greater than 70 µm², and in some embodiments between 70 and 90 µm² and in other embodiments between 80 and 90 µm² and still other embodiments between 75 and 85 µm²; MFD at 1550 nm greater than 9.0 µm, preferably greater than 9.5 µm, even more preferably greater than 10.0 µm; pin array at 1550 nm less than 15 dB, preferably less than 10 dB; lateral load at 1550 nm less than 1 dB/m, preferably less than 0.7 dB/m; LP11 cutoff (theoretical) less than 1400 nm; LP02 cutoff (theoretical) less than 1000 nm, preferably less than 900 nm; LP21 cutoff (theoretical) less than 1000 nm, preferably less than 900 nm; LP11 cable cutoff less than 1200 nm, preferably less than 1200 nm; LP02 cable cutoff less than 850 nm; LP21 cable cutoff less than 850 nm; the absolute magnitude of the dispersion of 1310 nm less than 5 ps/nm-km, preferably less than 2 ps/nm-km; dispersion slope at 1310 nm less 0.1 ps/nm²-km, preferably less than 0.09 ps/nm²-km; lambda zero less than 1320 nm, preferably between 1280 and 1320 nm, and in some embodiments between 1300 and 1320 nm and in other embodiments between 1290 and 1310 nm; MFD at 1310 nm less than 9.5 µm, preferably between 8.5 and 9.5 µm.

1st Set of Embodiments

In a first set of embodiments, the entire core 101 comprises a central core segment 20 with a non-negative, preferably positive, relative refractive index profile, i.e. the entire core 101 has no depressed region or depressed index relative to the outer annular cladding 200. Preferably the core 101 comprises silica doped with germanium, i.e. germania doped silica. Dopants other than germanium, singly or in combination, may be employed within the core to obtain the desired refractive index, density, and/or viscosity. The core 101 comprises, and preferably consists of, a central segment 20 having an outer radius, $R_1$, with a maximum relative refractive index percent, $\Delta_{MAX}$. The central core segment 20 extends radially outwardly to an outer annular cladding 200 surrounding the central core segment 20 and directly adjacent thereto and having a relative refractive index percent, $\Delta_{CLAD}(r)$ in %. The relative refractive index at the centerline is $\Delta_0$. $R_1$ for this first set of embodiments is defined to occur at the intersection of the horizontal $\Delta(r)=0\%$ axis and a straight line drawn tangent to the relative refractive index of the central segment 20 at half the peak $\Delta$ of the central segment 20, i.e. at the half-height. $\Delta_1(r)$ is positive for all radii from 0 to $R_1$. Some of the dopant(s) present in the core 101 may diffuse into the cladding 200 to produce what is often referred to as a diffusion tail. Preferably, $\Delta_{CLAD}(r)<0.05\%$, for all radii from $R_1$ to the outermost radius of the cladding 200, i.e. the outermost diameter of the silica-based part of the optical fiber (excluding any coating). In some embodiments, $\Delta_{CLAD}(r)=0\%$ for all radii from r=10 µm to the outermost radius of the cladding 200. In other embodiments, $\Delta_{CLAD}(r)<0.03\%$ for all radii from r=6 µm to the outermost radius of the cladding 200. In still other embodiments, $\Delta_{CLAD}(r)=0\%$ for all radii from $R_1$ to the outermost radius of the cladding 200. In some embodiments, $\Delta_{CLAD}(r)<0.03\%$ for all radii greater than 6 µm and $\Delta_{CLAD}(r)=0\%$ for all radii from r=10 µm to the outermost radius of the cladding 200. The core 101 ends and the cladding 200 begins at a radius $R_{CORE}$, and $R_{CORE}=R_1$ in the first set of embodiments.

In the first set of embodiments, the central peak region 22 extends from the centerline (r=0) to a radius $R_A$ of between 0.2 and 1.5 µm, preferably between 0.2 and 1.0 µm. The central peak region 22 preferably comprises a flat portion having a relative refractive index profile $\Delta(r)$ which varies by less than 0.02%, preferably less than 0.01%, over a radial span of at least 0.2 µm, in some embodiments over a radial span of at least 0.5 µm, in other embodiments over a radial span of at least 1.0 µm, in still other embodiments over a radial span of at least 1.5 µm, for radii≦2.0 µm, and preferably for radii≦1.5 µm. For example, in at least one embodiment $\Delta$ varies between 0.36% and 0.37% (i.e. varies by 0.01%, which is less than 0.02%) between a radius of 0.5 µm and 1.5 µm (a radial span of 1.5−0.5=1.0 µm, and the radii from 0.5 to 1.5 µm are ≦2.0 µm). In some embodiments, the core 101 has no centerline dip in its relative refractive index profile at or near the centerline. In other embodiments, the core 101 has a centerline dip 26 in its relative refractive index profile at or near the centerline. Preferably, the profile has a centerline dip 26 having a radial width of about 0.5 µm or less.

In the first set of embodiments, the central core segment 20 has an alpha (α) shape over a radial span of at least 2.0 µm, preferably over a radial span of at least 2.5 µm, more preferably over a radial span of at least 3.0 µm. In some embodiments, the core 101 has an alpha (α) shape over a radial span of at least 3.5 µm. In other embodiments, the core 101 has an alpha (α) shape over a radial span of at least 4.0 µm. In the alpha region 24, $2.20\leq\alpha\leq2.60$, and preferably $2.30\leq\alpha\leq2.50$. The alpha region 24 extends radially from $R_A$ to at least 4.0 µm, preferably to at least 4.5 µm. In some embodiments, the alpha region 24 extends radially from 1.5 to 4.5 µm. In other embodiments, the alpha region 24 extends radially from 1.0 to 4.5 µm. In other embodiments, the alpha region 24 extends radially from 1.0 to 5.0 µm. In still other embodiments, the alpha region 24 extends radially from 0.2 to about 5.0 µm.

In some embodiments, the alpha region 24 is offset radially away from the centerline by the presence of the central peak region 22 (which may include a centerline dip 26) such that the entire relative refractive index profile of the core 101 would not be considered to be entirely an alpha shape profile. However, the central peak region 22 preferably gradually transitions into the alpha region 24. That is, the initial portion of the alpha region 24, while following the shape defined by the power exponent, α, also does not vary much, and so is substantially constant, i.e. flat.

In the core 101, $\Delta_{1MAX}<0.40\%$ and $R_1<6.5$ µm. Preferably, $0.30\%<\Delta_{1~MAX}<0.43\%$. More preferably, $0.33\%<\Delta_{1~MAX}<0.40\%$. Still more preferably, $0.35\%\leq\Delta_{1~MAX}\leq0.38\%$. Preferably, 5.0 µm<$R_1$<6.5 µm, more preferably 5.5<$R_1$<6.0 µm. Preferably, $\Delta(r)$ for all radii greater than 6.0 µm is less than or equal to 0.03%. Preferably a substantial portion of the cladding 200 is pure silica.

Figure 2:
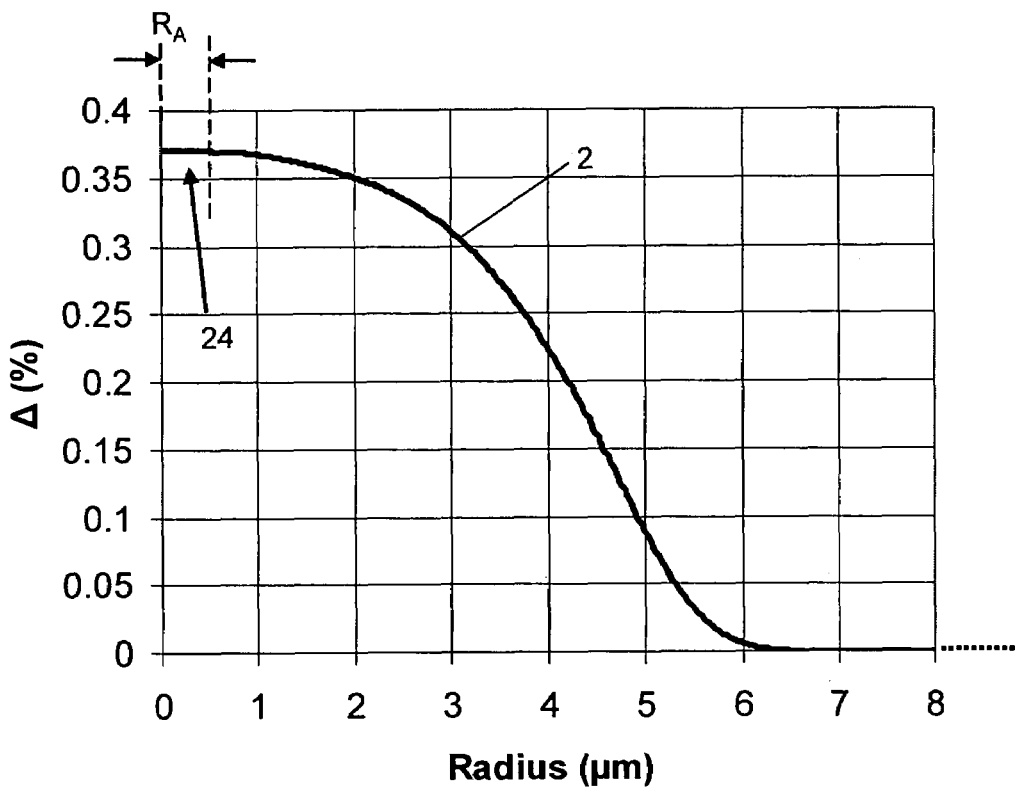
Figure 5:
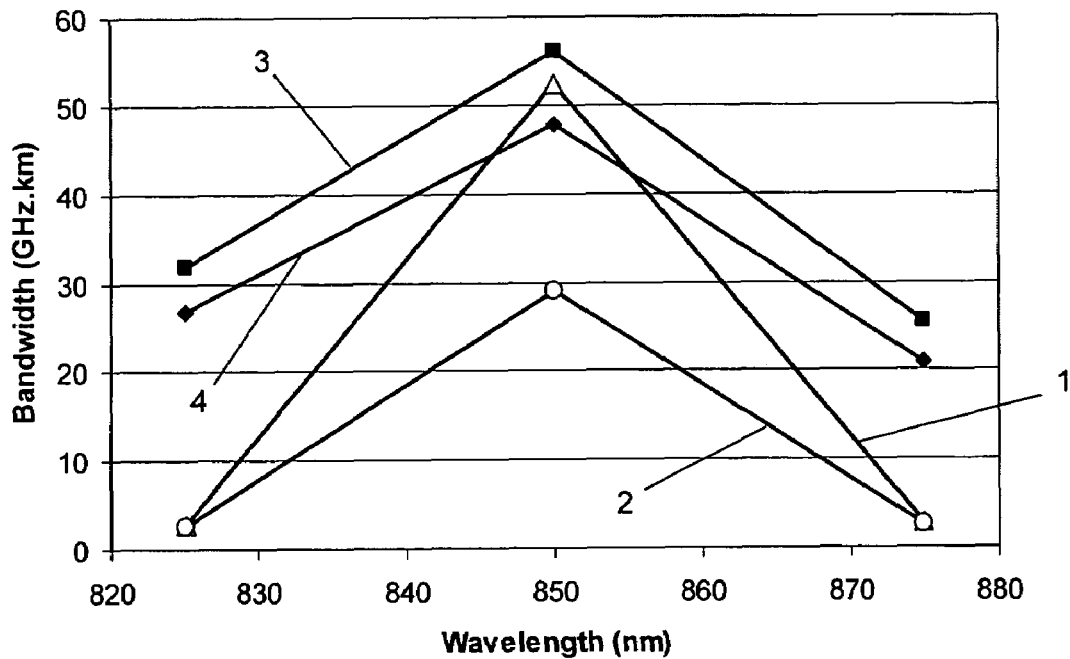
FIG. 5 shows bandwidth versus wavelength for the optical fiber profiles of FIGS. 1-4, labeled 1-4 respectively.

Tables 1 and 2 list characteristics of Examples 1 to 2 illustrative of the first set of embodiments. FIGS. 1 and 2 show the relative refractive index profiles corresponding to Examples 1 and 2, labeled as curves 1 and 2, respectively, and FIG. 5 shows the respective fiber bandwidth versus wavelength for the fibers represented by curves 1 and 2, labeled 1 and 2, respectively.

TABLE 1

|  |  | Example | |
|---|---|---|---|
|  |  | 1 | 2 |
| $\Delta_0$ | % | 0.36 | 0.37 |
| $\Delta_{MAX}$ | % | 0.36 | 0.37 |
| $R_A$ | µm | 0.2 | 0.5 |
| $\Delta_{BMAX}$ | % | 0.37 | 0.38 |
| $R_1$ | µm | 5.8 | 5.7 |
| α |  | 2.44 | 2.36 |

TABLE 2

|  |  | Example | |
|---|---|---|---|
|  |  | 1 | 2 |
| Dispersion @ 1550 nm | ps/nm-km | 17.3 | 17.0 |
| Slope @ 1550 nm | ps/nm²-km | 0.0599 | 0.0595 |
| Attenuation @ 1550 nm | dB/km | 0.188 | 0.189 |
| Attenuation @ 1310 nm | dB/km | 0.334 | 0.335 |
| Aeff @ 1550 nm | µm² | 88.3 | 84.5 |
| MFD @ 1550 nm | µm | 10.82 | 10.59 |
| Pin Array @ 1550 nm | dB | 10.4 | 8.9 |
| Lateral Load @ 1550 nm | dB/m | 0.8 | 0.6 |
| LP11 Cutoff (theoretical) | nm | 1365 | 1349 |
| LP11 Cable Cutoff | nm | 1150 | 1150 |
| LP02 Cutoff (theoretical) | nm | 921 | 909 |
| LP02 Cable Cutoff | nm | 750 | 795 |
| LP21 Cutoff (theoretical) | nm | 848 | 838 |
| LP21 Cable Cutoff | nm | 775 | 810 |
| Dispersion @ 1310 nm | ps/nm-km | 0.09 | −0.17 |
| Slope @ 1310 nm | ps/nm²-km | 0.0887 | 0.0884 |
| Lambda Zero | nm | 1309 | 1312 |
| MFD @ 1310 nm | µm | 9.52 | 9.30 |
| Aeff @ 1310 nm | µm² | 69.6 | 66.4 |
| Bandwidth (fiber) @ 825 nm | GHz-km | 2.9 | 2.5 |
| Bandwidth (fiber) @ 850 nm | GHz-km | 52.3 | 29.0 |
| Bandwidth (fiber) @ 875 nm | GHz-km | 2.8 | 2.6 |

For optical fibers represented by Examples 1-2, $\Delta_0$ is between 0.35 and 0.40%, preferably between 0.36 and 0.39%, and even more preferably between 0.37 and 0.38%. $\Delta_{1MAX}$ is between 0.35 and 0.45%, preferably between 0.35 and 0.40%; $R_1$ is between 5 and 6 µm, preferably between 5.0 and 5.7 µm, and more preferably between 5.3 and 5.6 µm; $\alpha_1$ is between 2 and 3, preferably between 2.0 and 2.5, more preferably between 2.1 and 2.4.

Referring to FIG. 5 and Table 2, the fiber bandwidth of optical waveguide fiber in the first set of embodiments, such as Examples 1-2, is greater than 10 GHz-km at 850 nm. Other embodiments have a fiber bandwidth of greater than 20 GHz-km at 850 nm. Still other embodiments have a fiber bandwidth of greater than 30 GHz-km at 850 nm. The fiber bandwidth is greater than 10 GHz-km at all wavelengths in a wavelength range having a rangewidth of at least 10 nm, wherein the wavelength range lies between 830 and 870 nm, and in other embodiments wherein the wavelength range lies between 840 and 860 nm.

2nd Set of Embodiments

In a second set of embodiments, the core 101 comprises first and second segments. i.e. both a raised index central core segment 20 (with a positive $\Delta_1(r)$) and an annular depressed index segment 30 (with a negative $\Delta_2(r)$). In some embodiments, the central core segment 20 comprises silica doped with germanium, i.e. germania doped silica, and the annular segment 30 comprises a downdopant such as fluorine.

The central core segment 20 comprises a relative refractive index profile, $\Delta_1(r)$ in %, with a maximum relative refractive index percent, $\Delta_{1MAX}$, and ends at outer radius, $R_1$; an annular segment 30 surrounds the central segment 20 and is directly adjacent thereto, and has a relative refractive index profile, $\Delta_2(r)$ in %, with a minimum relative refractive index percent, $\Delta_{2MIN}$, and extends radially outwardly to an annular segment outer radius, $R_2$. The relative refractive index at the centerline is $\Delta_0$. The annular segment 30 has a width $W_2$ disposed at a midpoint $R_{2MID}$. Outer annular cladding 200 surrounds the annular segment 30 and is preferably directly adjacent thereto and has a relative refractive index percent, $\Delta_{CLAD}(r)$ in %. $\Delta_{1MAX}>0>\Delta_{2MIN}$. $R_1$ for this second set of embodiments is defined to occur at the intersection of the relative refractive index of the central segment 20 with the horizontal $\Delta(r)=0\%$ axis. $R_2$ is defined to occur at the intersection of the horizontal $\Delta(r)=0\%$ axis and a straight line drawn tangent to the relative refractive index of the outer part of the annular segment 30 at half the peak $\Delta$ of the annular segment 30, i.e. a tangent line drawn at the occurrence of the half-height of $\Delta_{2MIN}$ at a radius greater than the radius at which $\Delta_{2MIN}$ occurs. The annular segment 30 begins at $R_1$ and ends at $R_2$. The width $W_2$ of the annular segment 30 is $R_2-R_1$ and its midpoint $R_{2MID}$ is $(R_1+R_2)/2$. The inner half peak height ($\Delta_{2MIN}/2$) of the annular segment 30 occurs at a radius $R_{2HHI}$. The outer half peak height ($\Delta_{2MIN}/2$) of the annular segment 30 occurs at a radius $R_{2HHO}$. The half-height peak width of the annular segment 30, HHPW2, is $R_{2HHO}-R_{2HHI}$, and the midpoint of the half-height peak width of the annular segment 30, $R_{2HHMID}$, is $(R_{2HHI}+R_{2HHO})/2$. $\Delta_1(r)$ is positive for all radii from 0 to $R_1$. Preferably, $\Delta_{CLAD}(r)<0.03\%$, even more preferably $<0.02\%$, for all radii from $R_2$ to the outermost radius of the cladding 200, i.e. the outermost diameter of the silica-based part of the optical fiber (excluding any coating). The core 101 ends and the cladding 200 begins at a radius $R_{CORE}$, and $R_{CORE}=R_2$. In some embodiments, the core 101 has no centerline dip in its relative refractive index profile at or near the centerline. In other embodiments, the core 101 has a centerline dip 26 in its relative refractive index profile at or near the centerline, such as a profile dip having a width of about 0.5 µm or less.

The central core segment 20 comprises an alpha region 24 wherein the relative refractive index profile of the core has an alpha ($\alpha$) shape over a radial span of at least 2.0 µm, preferably over a radial span of at least 2.5 µm, more preferably over a radial span of at least 3.0 µm, and still more preferably at least 3.5 µm. In some embodiments, the profile has an alpha ($\alpha$) shape over a radial span of at least 4.0 µm. In the alpha region 24, $2.0 \leq \alpha \leq 2.9$, and preferably $2.2 \leq \alpha \leq 2.8$, more preferably $2.4 \leq \alpha \leq 2.7$. The alpha region 24 extends at least from a radius of 2.0 to 4.0 µm, preferably at least from a radius of 2.0 to 4.5 µm, more preferably at least from a radius of 2.0 to 5.0 µm. In some embodiments, the alpha region 24 extends at least from a radius of 2.0 to 5.5 µm. The maximum $\Delta$ in the alpha region 24 is $\Delta_{BMAX}$. Preferably $\Delta_{BMAX}$ is between 0.33% to 0.37%.

Figure 3:
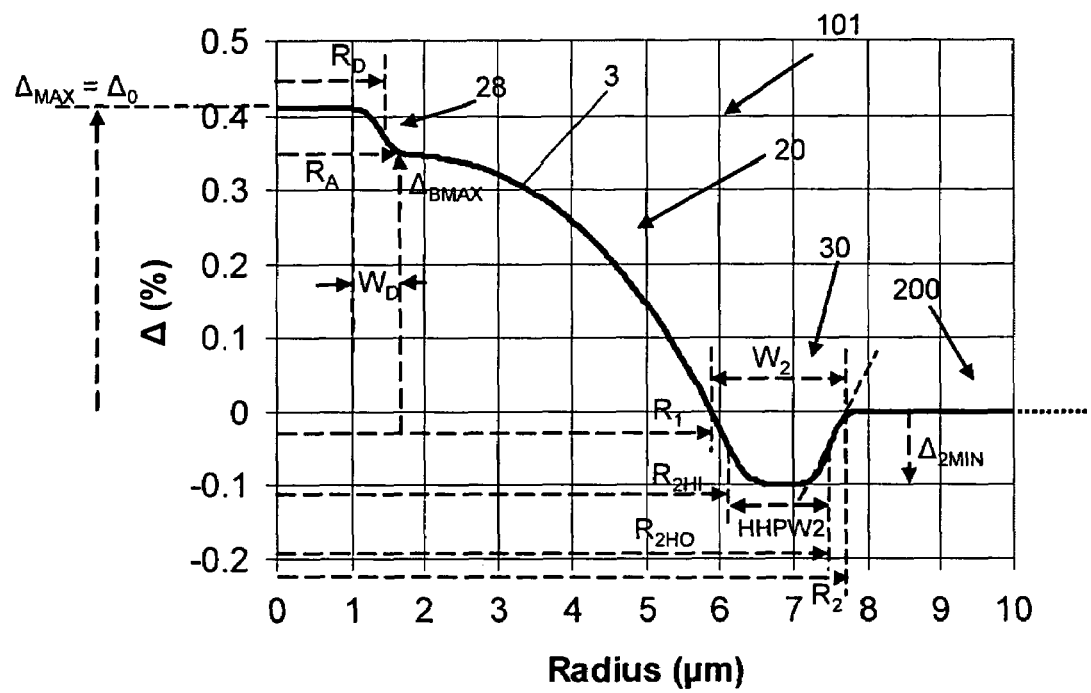
FIGS. 3-4 shows a refractive index profile corresponding to a second set of embodiments of an optical waveguide fiber as disclosed herein.
Figure 4:
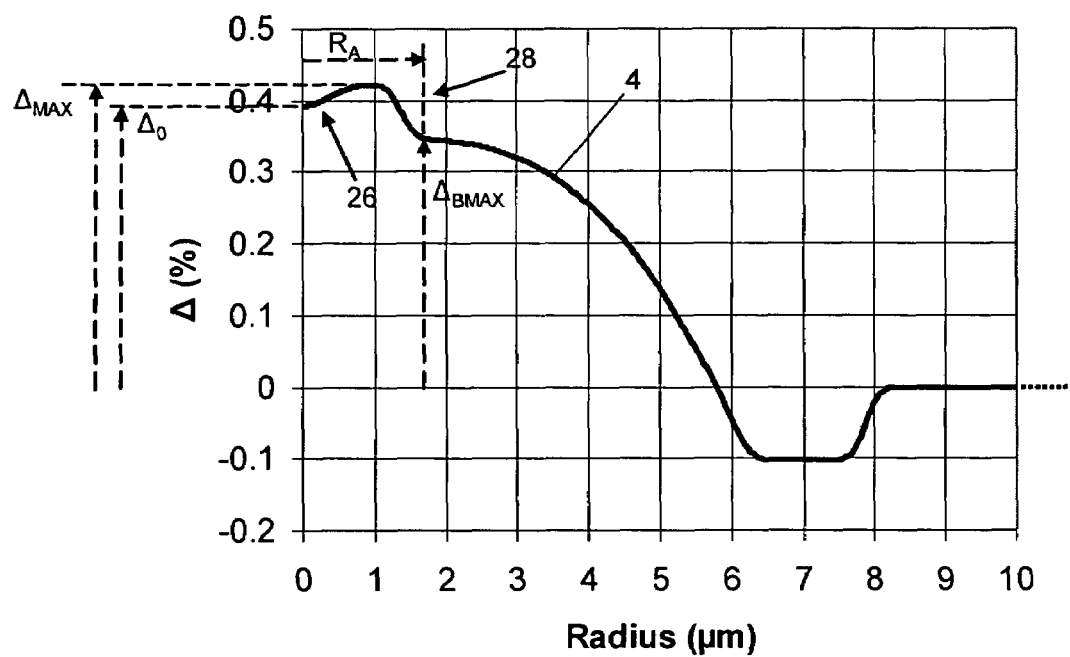

The central segment 20 also comprises a central peak region 22 disposed about the centerline between a radius of 0 to a radius $R_A$. In some embodiments the central peak region 22 includes a centerline dip 26, and in those embodiments, the centerline dip 26 extends over a radial span of less than 1 µm, preferably less than 0.5 µm. FIG. 4 shows a centerline dip 26. In other embodiments, the central peak region 22 has no centerline dip. FIG. 3 shows no centerline dip. The central peak region 22 contains $\Delta_{MAX}$ and extends to $R_A$, wherein $R_A$ is between 1.0 and 2.0 µm, preferably between 1.2 and 1.8 µm, more preferably between 1.3 and 1.6 µm. The transition from the central peak region 22 to the alpha region 24 is characterized by a relatively sharp step or drop in refractive index that occurs in a drop portion 28. The drop portion 28 is disposed in the central peak region 22 and preferably lies within 0.5 µm of $R_A$. The drop, $\Delta_{1MAX}-\Delta_{BMAX}$, has a magnitude of 0.03 to 0.08%, preferably 0.05 to 0.07%, and has a radial width of less than 1 µm, preferably less than 0.07 µm. Preferably, the midpoint of the decrease is located at a radius $R_D$ of 1.3 to 1.5 µm. The central peak region 22 preferably comprises a flat portion which is substantially flat wherein the relative refractive index profile is substantially constant, i.e. $\Delta_1(r)$ varies by less than 0.02%, over a radial span of at least 0.5 µm, preferably over a radial span of at least 1.0 µm, for radii $\leq 2.0$ µm, preferably for radii $\leq 1.5$ µm. In some embodiments, the profile in the central peak region 22 is substantially flat or substantially constant over a radial span of at least 1.5 µm. For embodiments having a flat portion, the alpha region 24 surrounds and is preferably directly adjacent (contacting) the flat portion.

In the core 101, $\Delta_{1MAX}<0.45\%$ and $R_1<6.5$ µm. Preferably, $0.37\%<\Delta_{1\ MAX}<0.43\%$. More preferably, $0.38\% \leq \Delta_{1\ MAX} \leq 0.42\%$. Preferably, 5.5 µm$<R_1<6.5$ µm. In annular segment 30, $\Delta_{2MIN}>-0.15\%$ and $R_2<10$ µm. Preferably, $-0.15\%<\Delta_{2\ MIN}<-0.05\%$, more preferably $-0.12\%<\Delta_{2\ MIN}<-0.07\%$, even more preferably $-0.11\%<\Delta_{2\ MIN}<-0.090\%$. Preferably, 7.0 µm$<R_2<9.0$ µm, more preferably 7.5 µm$<R_2<8.5$ µm. Preferably, $\Delta(r)$ for all radii greater than 10.0 µm is less than or equal to 0.02%. Preferably, $W_2$ is between 1 and 4 µm, more preferably between 1 and 3 µm; and $R_{2MID}$ is between 6 and 8 µm, preferably between 6.5 and 7.5 µm. $R_{2HI}$ is between 5.5 and 6.5 µm, $R_{2HO}$ is between 7 and 9 µm, HHPW$_2$ is preferably between 1 and 3 µm, more preferably between 1 and 2 µm, and $R_{2HMID}$ is preferably between 6.0 and 7.5 µm, more preferably between 6.5 and 7.5 µm.

Figure 6:
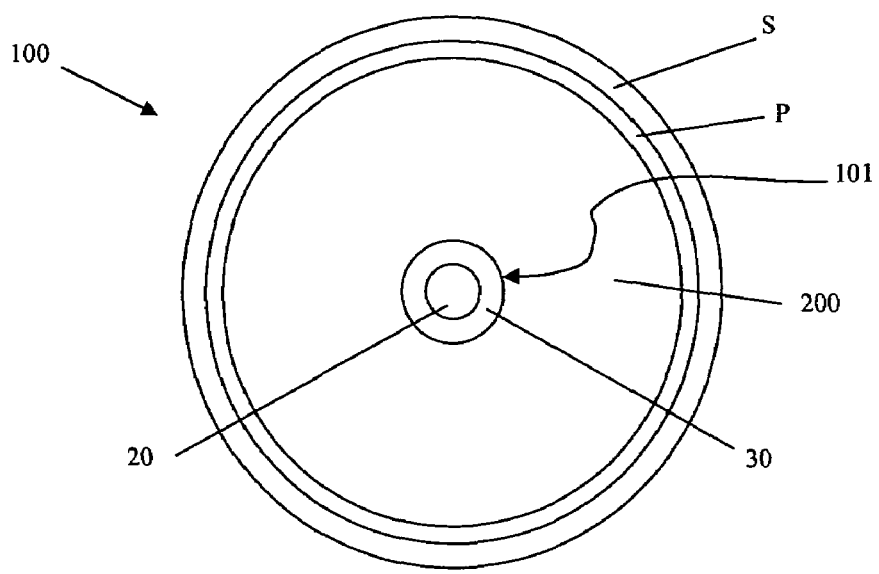
FIG. 6 is a schematic representation of an optical waveguide fiber as disclosed herein having a core and a clad layer directly adjacent and surrounding the core, wherein the core comprises two core segments.

Tables 3-4 list characteristics of Example 4 which is illustrative of the second set of embodiments. FIGS. 4-5 show the relative refractive index profiles corresponding to Examples 4-5, labeled as curves 4-5, respectively, and FIG. 6 shows the fiber bandwidth versus wavelength of the fibers represented by curves 4-5, labeled 4-5, respectively.

TABLE 3

| | | Example | |
|---|---|---|---|
| | | 3 | 4 |
| $\Delta_0$ | % | 0.41 | 0.39 |
| $\Delta_{MAX}$ | % | 0.41 | 0.42 |
| $\Delta_{BMAX}$ | % | 0.35 | 0.35 |
| $R_A$ | μm | 1.7 | 1.7 |
| $R_D$ | μm | 1.3 | 1.35 |
| $W_D$ | μm | 0.8 | 0.7 |
| $\Delta_{MAX} - \Delta_{BMAX}$ | % | 0.06 | 0.07 |
| $R_1$ | μm | 5.9 | 5.8 |
| $\alpha$ | | 2.5 | 2.6 |
| $\Delta_{2MIN}$ | % | −0.1 | −0.1 |
| $R_2$ | μm | 7.7 | 8.1 |
| $W_2$ | μm | 1.8 | 2.3 |
| $R_{2MID}$ | μm | 6.8 | 7.0 |
| $R_{2HI}$ | μm | 6.0 | 6.0 |
| $R_{2HO}$ | μm | 7.5 | 7.9 |
| HHPW2 | μm | 1.5 | 1.9 |
| $R_{2HMID}$ | μm | 6.8 | 7.0 |

TABLE 4

| | | Example | |
|---|---|---|---|
| | | 3 | 4 |
| Dispersion @ 1550 nm | ps/nm-km | 18.0 | 18.0 |
| Slope @ 1550 nm | ps/nm²-km | 0.0587 | 0.0582 |
| Attenuation @ 1550 nm | dB/km | 0.189 | 0.189 |
| Attenuation @ 1310 nm | dB/km | 0.334 | 0.334 |
| Aeff @ 1550 nm | μm² | 80.9 | 78.3 |
| MFD @ 1550 nm | μm | 10.29 | 10.12 |
| Pin Array @ 1550 nm | dB | 4.4 | 4.7 |
| Lateral Load @ 1550 nm | dB/m | 0.3 | 0.3 |
| LP11 Cutoff (theoretical) | nm | 1367 | 1328 |
| LP11 Cable Cutoff | nm | 1185 | 1175 |
| LP02 Cutoff (theoretical) | nm | 899 | 874 |
| LP02 Cable Cutoff | nm | 810 | 795 |
| LP21 Cutoff (theoretical) | nm | 874 | 859 |
| LP21 Cable Cutoff | nm | 820 | 815 |
| Dispersion @ 1310 nm | ps/nm-km | 0.88 | 0.89 |
| Slope @ 1310 nm | ps/nm²-km | 0.0890 | 0.0891 |
| Lambda Zero | nm | 1300 | 1300 |
| MFD @ 1310 nm | μm | 9.18 | 9.03 |
| Aeff @ 1310 nm | μm² | 65.4 | 63.4 |
| Bandwidth (fiber) @ 825 nm | GHz-km | 31.9 | 26.9 |
| Bandwidth (fiber) @ 850 nm | GHz-km | 56.0 | 47.7 |
| Bandwidth (fiber) @ 875 nm | GHz-km | 25.5 | 21.0 |

Referring to FIG. 5 and Table 4, the fiber bandwidth at 850 nm of optical waveguide fiber in the second set of embodiments, such as Examples 3 and 4, is greater than 10 GHz-km. Other embodiments have a fiber bandwidth of greater than 20 GHz-km at 850 nm. Still other embodiments have a fiber bandwidth of greater than 30 GHz-km at 850 nm. Other embodiments have a fiber bandwidth of greater than 40 GHz-km at 850 nm. Other embodiments have a fiber bandwidth of greater than 50 GHz-km at a wavelength of 850 nm. In some embodiments, the fiber bandwidth is greater than 10 GHz-km at all wavelengths in a wavelength range having a rangewidth of at least 10 nm, wherein the wavelength range lies between 830 and 870 nm, and in other embodiments wherein the wavelength range lies between 840 and 860 nm. In other embodiments, the fiber bandwidth is greater than 20 GHz-km at all wavelengths in a wavelength range having a rangewidth of at least 10 nm, wherein the wavelength range lies between 830 and 870 nm, and in other embodiments wherein the wavelength range lies between 840 and 860 nm. In still other embodiments, the fiber bandwidth is greater than 30 GHz-km at all wavelengths in a wavelength range having a rangewidth of at least 10 nm, wherein the wavelength range lies between 830 and 870 nm, and in other embodiments wherein the wavelength range lies between 840 and 860 nm.

Preferably, the optical fiber disclosed herein is capable of transmitting optical signals in the 800 nm to 1650 nm wavelength range.

Preferably, the fibers 100 disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross-sectional profile of the optical waveguide fibers disclosed herein can be accomplished using manufacturing techniques known to those skilled in the art including, but in no way limited to, OVD, VAD and MCVD processes.

FIG. 6 is a schematic representation (not to scale) of an optical waveguide fiber 100 as disclosed herein having core 101 and an outer annular cladding or outer cladding layer or clad layer 200 directly adjacent and surrounding the core 101. The core 101 is shown with two segments 20, 30 as shown in FIG. 6 and in accordance with the second set of embodiments disclosed herein, for example. The clad layer 200 is surrounded by a primary coating P and a secondary coating S.

The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 may include one or more dopants. The refractive index of the cladding 200 is used to calculate the relative refractive index percentage as discussed elsewhere herein.

Preferably, the optical fiber disclosed herein has a silica-based core and cladding. In some embodiments, the cladding has an outer diameter, 2*Rmax, of about 125 μm. Preferably, the outer diameter of the cladding has a constant diameter along the length of the optical fiber. Preferably, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably, the coating has a constant diameter, radially and along the length of the fiber.

Figure 7:
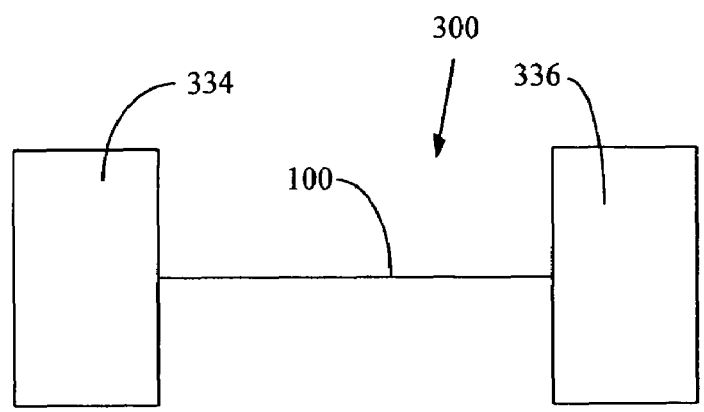
FIG. 7 is a schematic illustration of a fiber optic communication system comprising an optical fiber as disclosed herein.

As shown in FIG. 7, an optical fiber 100 as disclosed herein may be implemented in an optical fiber communication system 300. System 300 includes a transmitter 334 and a receiver 336, wherein optical fiber 100 allows transmission of an optical signal between transmitter 334 and receiver 336. System 300 is preferably capable of 2-way communication, and transmitter 334 and receiver 336 are shown for illustration only. The system 300 preferably includes a link which has a section or a span of optical fiber as disclosed herein. The system 300 may also include one or more optical devices optically connected to one or more sections or spans of optical fiber as disclosed herein, such as one or more regenerators, amplifiers, or dispersion compensating modules. In at least one embodiment, an optical fiber communication system according to the present invention comprises a transmitter and receiver connected by an optical fiber without the presence of a regenerator therebetween. In another embodiment, an optical fiber communication system according to the present invention comprises a transmitter and receiver connected by an optical fiber without the presence of an amplifier therebetween. In yet another embodiment, an optical fiber communication system according to the present invention comprises a transmitter and receiver connected by an optical fiber having neither an amplifier nor a regenerator nor a repeater therebetween.

Figure 8:
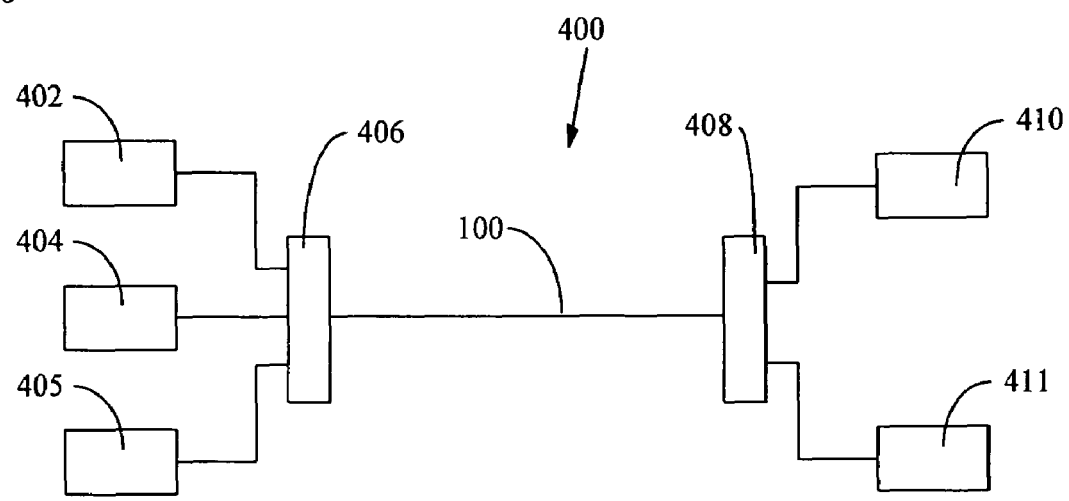
FIG. 8 is a schematic illustration of another optical fiber communication system which comprises an optical fiber disclosed herein.

FIG. 8 schematically illustrates another system 400 disclosed herein comprising a first transmitter 402, second transmitter 404, receiver 405, multiplexer 406, multiplexer 408, transmitter 410, receiver 411, and optical fiber 100 as disclosed herein.

The first transmitter 402, second transmitter 404, and receiver 405 are optically connected to the multiplexer 406, for example by optical fiber, and transmitter 410 and receiver 411 are optically connected to multiplexer 408. Multiplexer 406 and multiplexer 408 are optically connected via optical fiber 100 as disclosed herein.

In some embodiments the first transmitter 402 is capable of transmitting a first optical signal in a first wavelength range, the second transmitter 404 is capable of transmitting a second optical signal in a second wavelength range outside the first wavelength range, and transmitter 410 is capable of transmitting a third optical signal in a third wavelength range outside of the first and second wavelength ranges. The optical fiber 100 is capable of simultaneously carrying the first and second signals from multiplexer 406 to multiplexer 408 and the third signal from multiplexer 408 to multiplexer 406. The propagation of the first and second signals may be referred to as downstream transmission, and the propagation of the third signal may be referred to as downstream transmission. Receiver 405 is adapted to receive either the first or second signal, and receiver 412 is adapted to receive the third optical signal. Preferably the first and second signals are single-moded. Preferably the third signal is single-moded or dual-moded. In one embodiment, the first signal is within the 1310 nm band, the second signal is in the C-band, and the third signal is in the 850 nm band or the 980 nm band.

Preferably, the optical fibers disclosed herein have a low water content, and preferably are low water peak optical fibers, i.e. having an attenuation curve which exhibits a relatively low, or no, water peak in a particular wavelength region, especially in the E-band.

Methods of producing low water peak optical fiber can be found in U.S. Pat. No. 6,477,305, U.S. Patent Application Publication No. 2002102083, and PCT Application Publication No. WO01/47822.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths.

The fibers disclosed herein exhibit low PMD values particularly when fabricated with OVD processes. Spinning of the optical fiber may also lower PMD values for the fiber disclosed herein.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of the optical fiber disclosed herein.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 850 nm band, the 980 nm band, the 1310 nm band, the E-band, the S-band, the C-band, and the L-band.

In some embodiments, the system is capable of operating in a coarse wavelength division multiplex mode wherein one or more signals propagate in at least one, more preferably at least two of the following wavelength regions: the 850 nm band, the 980 nm band, the 1310 nm band, the E-band, the S-band, the C-band, and the L-band. In one embodiment, the system operates at one or more wavelengths between 1530 and 1565 nm.

In some embodiments, the system operates at $\geq$ about 1 Mb/s. In other embodiments, the system operates at $\geq$ about 640 Mb/s. In yet other embodiments, the system operates at $\geq$ about 2.5 Gbit/s. In still other embodiments, the system operates at $\geq$ about 10 Gbit/s. In even other embodiments, the system operates at greater than or equal to about 40 Gbit/s.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the embodiments of the invention as described herein can be made without departing from the spirit or scope of the invention as defined by the appended claims.

What is claimed is:

1. An optical waveguide fiber comprising:
a core comprising a central core segment extending radially outwardly from a centerline to a radius $R_1$ and having a positive relative refractive index percent profile, $\Delta_1(r)$ in %, wherein the central core segment comprises a maximum relative refractive index percent, $\Delta_{MAX}$; and
an outer annular cladding surrounding the core and comprising a relative refractive index percent, $\Delta_c(r)$ in %;
wherein $\Delta_{MAX} > 0$;
wherein the relative refractive index of the optical fiber provides an LP02 cable cutoff less than 850 nm and an LP21 cable cutoff less than 850 nm;
wherein the relative refractive index of the optical fiber provides a bandwidth greater than 10 GHz-km at all wavelengths in a wavelength range having a rangewidth of at least 10 nm; and
wherein the wavelength range lies between 830 and 870 nm.

2. The optical fiber of claim 1 wherein the relative refractive index of the optical fiber provides an LP11 cable cutoff less than 1260 nm.

3. The optical fiber of claim 1 wherein the outer annular cladding is directly adjacent the central core segment.

4. The optical fiber of claim 1 wherein the core further comprises an annular segment surrounding and directly adjacent to the central core region and extending to a radius $R_2$ and having a negative relative refractive index percent profile, $\Delta_2(r)$ in %, with a minimum relative refractive index percent, $\Delta_{2MIN}$.

5. The optical fiber of claim 1 wherein the relative refractive index of the optical fiber provides a dispersion at 1550 nm between 16 and 20 ps/nm/km.

6. The optical fiber of claim 1 wherein the relative refractive index of the optical fiber provides a zero dispersion between 1280 and 1320 nm.

7. The optical fiber of claim 1 wherein the relative refractive index of the optical fiber provides an absolute magnitude of dispersion at 1310 nm less than 5 ps/nm/km.

8. The optical fiber of claim 1 wherein $\Delta_{1MAX}$ is between 0.35 and 0.45%.

9. The optical fiber of claim 1 wherein $\Delta_{2MIN}$ is between −0.05 and −0.15%.

10. The optical fiber of claim 1 wherein the optical fiber has an effective area of greater than about 60 μm$^2$ at 1550 nm.

11. The optical fiber of claim 1 wherein the optical fiber has an attenuation less than 0.20 dB/km at 1550 nm.

12. The optical fiber of claim 1 wherein the pin array loss of the optical fiber is less than 10 dB.

13. The optical fiber of claim 1 wherein the optical fiber has an attenuation of less than 0.4 dB/km at a wavelength of about 1310 nm.

14. The optical fiber of claim 1 wherein the optical fiber has an attenuation at 1380 nm not more than 0.1 dB/km greater than an attenuation at 1310 nm.

15. An optical waveguide fiber comprising:

a core comprising a central core segment extending radially outwardly from a centerline to a radius $R_1$ and having a positive relative refractive index percent profile, $\Delta_1(r)$ in %, wherein the central core segment comprises a maximum relative refractive index percent, $\Delta_{MAX}$; and an outer annular cladding surrounding the core and comprising a relative refractive index percent, $\Delta_c(r)$ in %;

wherein $\Delta_{MAX} > 0$;

wherein the relative refractive index of the optical fiber provides an LP02 cable cutoff less than 850 nm and an LP21 cable cutoff less than 850 nm; and wherein the central core segment comprises an alpha region having an alpha between 2.0 and 2.9.

16. The optical fiber of claim 15 wherein the central core segment further comprises a central peak region disposed between the centerline and the alpha region, wherein the central peak region contains the maximum relative refractive index of the optical fiber.

17. The optical fiber of claim 15 wherein the central core segment further comprises a central peak region, wherein $\Delta_{MAX}$ is disposed in the central peak region, and the alpha region comprises a maximum relative refractive index percent, $\Delta_{BMAX}$, wherein $\Delta_{1MAX} - \Delta_{BMAX}$, is between 0.03% and 0.08%.

* * * * *